May 18, 1965     J. J. SANDONE     3,183,898
ROTARY ENGINE

Filed Dec. 6, 1962     2 Sheets-Sheet 1

INVENTOR.
JOHN J. SANDONE
BY *Edward M. Farrell*
ATTORNEY

May 18, 1965     J. J. SANDONE     3,183,898
ROTARY ENGINE
Filed Dec. 6, 1962     2 Sheets-Sheet 2
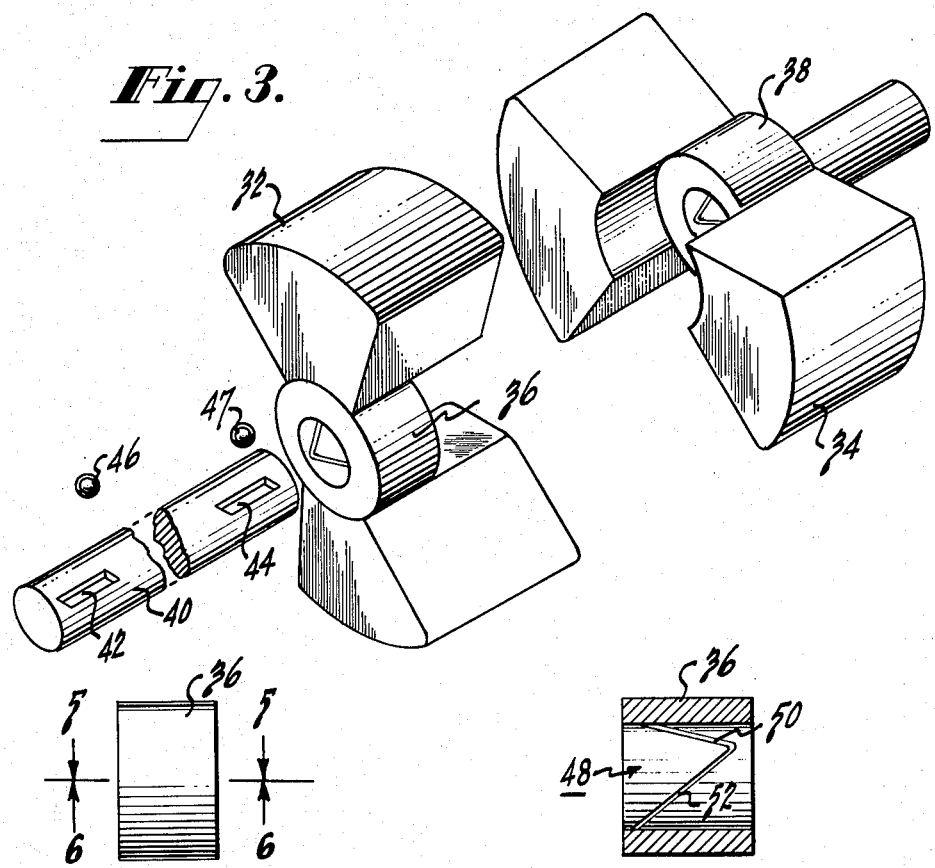
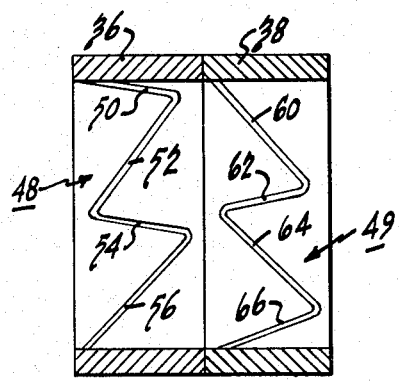
INVENTOR.
JOHN J. SANDONE
BY
ATTORNEY

United States Patent Office 3,183,898
Patented May 18, 1965

3,183,898
ROTARY ENGINE
John J. Sandone, 117 French Ave., Haddon Township, Camden County, N.J.
Filed Dec. 6, 1962, Ser. No. 242,749
14 Claims. (Cl. 123—11)

This invention relates to rotary engines, and more particularly to means for controlling the operation of such engines.

In an internal combustion engine used in automobiles, for example, a carburator is generally used to vaporize gasoline and mixes the vapor with air to form an explosive mixture. Such an explosive mixture is ignited in the cylinder of the gas engine by means of an electric spark. The energy from successive explosions drives the piston which furnishes the power to move the automobile.

The cylinder generally comprises a thick wall, with the piston tightly fitted therein so that gas cannot pass. A connecting rod connects the piston with a crankshaft.

One form of internal combustion engine may be considered as involving four cycles. During the first cycle, called the intake cycle, the explosive mixture is moved into the cylinder. As the piston continues to move, it causes the explosive mixture to be compressed. This is called the compression cycle. After the mixture has been compressed, a spark ignites the mixture to cause an explosion to drive the piston with great force. This is called the ignition cycle or power stroke. Finally, during the fourth cycle, called the exhaust cycle, the waste gases left after the explosion are pushed out of the cylinder.

Various types of rotary engines have been developed over the past years. These engines have generally involved rotating elements rather than the conventional pistons involved in most automobiles, which operate on a straight or linear motion. While such rotary engines have proven to be theoretically feasible, it is believed that the complexity and cost involved have prevented them from being commercially accepted in the automotive industry.

In many of the rotary engines developed heretofore, the means employed for controlling the relative speed of the power stroke elements have involved relatively expensive complex gear mechanisms.

It is an object of this invention to provide an improved rotary engine.

It is a further object of this invention to provide an improved rotary engine in which friction and wear within the engine is minimized.

It is still a further object of this invention to provide an improved rotary engine in which the number of moving parts is minimized.

It is still a further object of this invention to provide an improved rotary engine of high efficiency which is relatively simple in design.

It is still a further object of this invention to provide an improved rotary engine which is relatively inexpensive to manufacture.

It is still a further object of this invention to provide a novel speed control mechanism which is adaptable for use in various types of rotary engines.

In accordance with the present invention, a rotary engine includes a pair of vane members each having a groove therein. A shaft, having a groove therein, fits into a pair of hub elements associated with the vane members. Slidable elements are disposed to ride in the grooves of the hub elements and the shaft to transmit the motion of the shaft to the vane members. The relative speeds of the vane members with respect to each other are variable in accordance with the angle of the groove of the shaft and with respect to the grooves in the elements.

Other objects and advantages of the present invention will be apparent and suggest themselves to those skilled in the art from a reading of the following specification and claims, in conjunction with the accompanying drawings, in which:

FIGURE 3 is an exploded view of the elements illustrated in FIGURE 2;

FIGURE 4 illustrates a hub element of FIGURE 3 separated from its associated vane;

FIGURE 5 is a cross sectional view taken along lines 5—5 of FIGURE 4;

FIGURE 6 is a cross sectional view taken along lines 6—6 of FIGURE 4, and

FIGURE 7 illustrates an internal view of the interior of the hub members of FIGURE 2, if such hub members were cut through to their central apertures and spread out flat, shown for purposes of explanation.

Figure 1A:
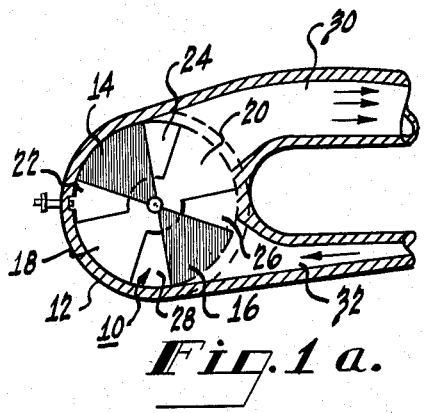
FIGURES 1a, 1b, 1c and 1d are diagrams illustrating the basic operation of a rotary engine embodying the present invention.

Referring to FIGURES 1a, 1b, 1c and 1d, a working chamber or space 10, which may be considered somewhat similar to an entire cylinder block of a piston engine, comprises a round drum 12 closed at either end. The drum may be completely water jacketed for cooling purposes. Details regarding cooling systems, ignition systems and other details relating to engine operation are not shown or described since such details are well known to those skilled in the art and are only indirectly related to the present invention.

For purposes of explaining the theory involved in a rotary engine relating to the present invention, the power producing elements may be considered as comprising a pair of wedge shaped vanes 14 and 16 acting as working pistons which are connected to a drive shaft, in a manner to be described. A second pair of wedge shaped vanes 18 and 20 may be considered as reaction or lift pistons. These latter elements are connected to the drive shaft, in a manner to be described.

There are four spaces or chambers 22, 24, 26 and 28 between the piston vanes. As the piston vanes 14, 16, 18 and 20 rotate around their common axis, they move at different rates of speed so that the spaces between vanes grow alternately larger and smaller, changing displacement. This action is somewhat similar to cylinders in a conventional internal combustion engine, in which the pistons rise and fall.

Each of the spaces or chambers 22, 24, 26 and 28 acts like a cylinder. Therefore, each single chamber engine 10 may be considered as, in effect, as being the equivalent of a four cylinder engine.

Figure 1B:
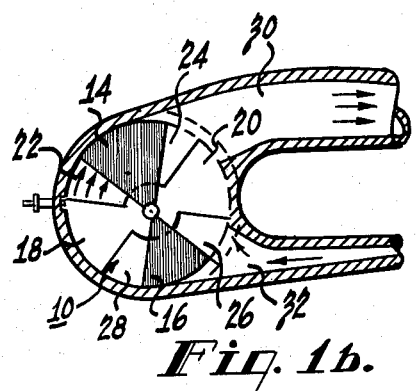

In FIGURE 1a, the ignition of the gases compressed between the working piston or vane 14 and the lift piston or vane 18 is illustrated. FIGURE 1b illustrates the two pistons 14 and 18 moving apart as they are driven by expanding gases. The chamber 26, which is 180 degrees opposite the chamber 22, grows larger as the pistons 16 and 20 are also drawn apart. As the discplacement of the pistons 16 and 20 commences, the intake stroke takes place.

The working piston 14 travels in a clockwise direction and, as the burning gases expand, it is driven faster than the lift piston 18. In spite of the explosive force driving the pistons 14 and 18 apart, the lift piston 18 is also travelling in a clockwise direction, but at a slower speed. The control mechanism that provides such a differential motion is one of the main features of the present invention, as will be described.

Figure 1C:
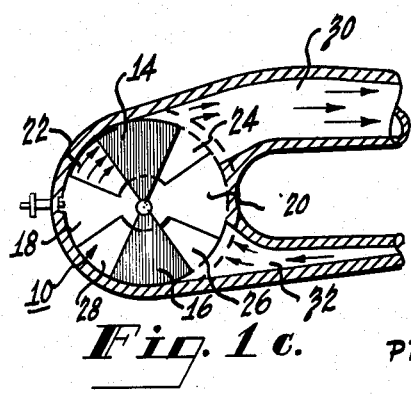

FIGURE 1c illustrates the completion of of the combustion stroke, with the burned exhaust gases flowing from the chamber between the pistons via slots in the chamber wall 12 into the exhaust duct 30. At the same time, 180 degrees away from the exhaust stroke, the intake stroke between the pistons 16 and 20 is nearing completion.

Figure 1D:
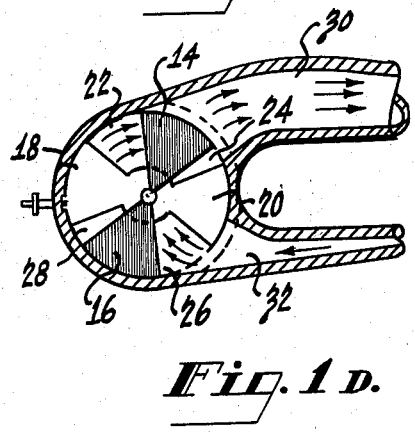

FIGURE 1d illustrates the working piston 14 as far ahead of the lift piston 18 as it can go. At this point, the control mechanism, to be described, causes the sequence to reverse and permit the piston 18 to catch up with the piston 14 and squeeze out the exhaust gases while compressing the mixture which is almost completely drawn in below.

As each space of cylinders 22, 24, 26 and 28 between the opposed pistons makes a complete revolution of 360 degrees around the working chamber, two compressions and two expansions take place making the full four cycles of operation. Consequently, a four cylinder, four cycle internal combustion engine without valves is had by a mechanism involving the features of FIGURES 1a, 1b, 1c and 1d. The pistons themselves, in passing over the intake duct 32 and exhaust duct 30 perform the same operational functions as the reciprocating piston as some conventional engines which cover and uncover ports as the piston moves up and down in the cylinder.

The control speed mechanism which causes the wedge shaped pistons 14, 16, 18 and 20 to cycle while rotating in the same direction, in combination with a rotary engine of the type described, form part of the present invention.

Figure 2:
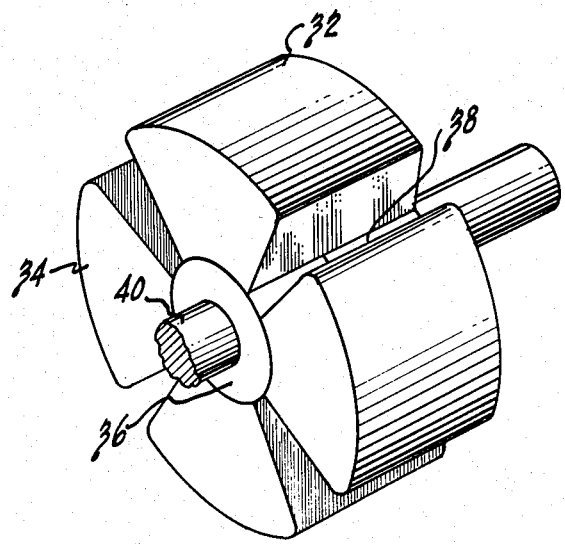
FIGURE 2 is a prospectus view of a pair of vane members and a shaft element, in accordance with the present invention.

Referring particularly to FIGURE 2, a pair of vane members 32 and 34 are integrally connected to hub elements 36 and 38, respectively. The hub elements may be cast along with the vane elements or single pieces or the hubs may be welded or otherwise suitably mounted to their respective vane member. The hub elements each include an aperture to permit a shaft 40 to pass therethrough. The relative speeds of the vane elements 32 and 34 with respect to each other constantly changes during the operation of the rotary engine, of which they form parts, to attain the piston-like actions described in connection with FIGURES 1a, 1b, 1c and 1d.

Referring particularly to FIGURE 3, an exploded view of the vanes and shaft combination is illustrated. The shaft element 40 includes a pair of grooves 42 and 44 adapted to receive motion transmitting elements, illustrated as being balls 46 and 47, respectively.

Referring to FIGURES 4, 5 and 6, along with FIGURE 3, the hub element 36 includes a curved groove 48 which is also adapted to receive the ball 46 or other suitable motion transmitting elements. A similar type groove of opposite phase angles (not illustrated) is also cut in the hub element 38 to receive the ball 47. The ball 47 is adapted to ride in the groove 44 of the shaft to proivde the motion transmitting means between the shaft 36 and the vane 34.

During operation, the shaft 36 is rotating. The operation may be started in a manner similar to conventional engines, by a starting motor, for example. As the shaft rotates, the balls 46 and 47 ride in the grooves 42 and 44, respectively, of the shaft and the curved grooves of the hub elements 36 and 38. The ball elements transmits the motion of the shaft to the vane elements 32 and 34.

The vane elements 32 and 34 are grooved alike but are mounted as opposites on the power shaft.

While the rate of speed of the shaft 36 may be substantially constant (as maintained by a flywheel, for example), the rates of speed of the vane elements 32 and 34 are dependent upon the angles of the grooves within the hub elements 36 and 38. As the angle of the grooves within the hub elements approach 90 degrees with respect to the directions of the grooves 42 and 44 in the shaft, the speed of the vane elements 32 and 34 will decrease. As the angles of the grooves in the hub elements 36 and 38 approach zero degrees with respect to the grooves 42 and 44, the speed of the vane elements 32 and 34 will increase toward a maximum. Thus, the speeds of the vane members depend upon the relative angle of the grooves in the hubs with respect to the grooves in the shaft.

During operation, the vane members 32 and 34 are moved in synchronization with each other. At one point, one of the vane members acts as the driving member driven by the explosion of the fuel mixture while the other member acts as the driven member. 180 degrees later, the reverse is true with the second vane member acting as the driving member and the first vane member being the driven member. The driving vane member transmits its motion through the shaft 36 to the driven vane member.

While the grooves 42 and 44 in the shaft 40 have been illustrated as two separate aligned grooves, one continuous groove may of course be provided instead. Also, the groove or grooves in the shaft need not be straight as illustrated but may be curved. The particular angles of the grooves in the shaft with respect to the grooves in the hubs is dependent upon the particular speed relationship desired. Some designs may require that the grooves in the shaft be maintained in different alignments with respect to each other.

The internal surfaces of the hub members are so grooved so that the keys of the power shaft will travel across the hubs four times, i.e. back and forth twice, for each 360 degrees rotation of the vanes and hubs.

In some designs, it may be desirable to have straight grooves in the hubs with the curved grooves in the shaft. In other cases, both the grooves in the hubs and shafts may be curved or somewhat spiral in form.

Referring particularly to FIGURE 7, the internal grooves within the hubs 36 and 38 are represented in somewhat diagrammatical form for purposes of explanation. The hubs 36 and 38 are depicted as being cut through to their centers and then flattened out.

During operation, the balls 46 and 47, which may be considered keys or pins, riding in the grooves 42 and 44 also rides in the grooves 48 and 49, respectively, depicted as being zig-zag in forms in FIGURE 7 but actually being spiral or helical in forms within the hubs 36 and 38. As the ball 46 rides from left to right along a first portion 50 of the groove 48, the hub 36 and its associated vane member is moved at a relatively high speed since this portion of the groove bears a low angular relationship with respect to the groove in the shaft. In a preferred embodiment of the present invention, the hub 36 is moved about 22.5 degrees as the ball 46 traverses the portion of the groove 50.

After the ball 46 has made one excursion to the right, it will then move from right to left within the portion 52 of the groove 48. This portion of the groove is at a somewhat high angle with respect to the groove in the shaft. The angle of rotation of the hub 36 may be approximately 157.5 degrees as the ball 46 traverses the portion 52. Consequently, the hub will be moved at a relatively low speed with respect to the shaft.

The relative speeds of the hub 36 as the ball 46 traverses the grooves 50 and 52 are approximately 7 to 1 ratio, since the angles of the grooves with respect to the groove in the shaft has a ratio of 7 to 1.

After the ball 46 has moved from right to left across the portion 52 of the groove, the direction of the ball 46 is again reversed as it again moves from left to right in the portion 54 of the groove. The angle of this portion of the groove with respect to the groove in the shaft is the same than that formed by the portion 50, i.e. 22.5 degrees.

The final movement of the ball 46 is from right to left across the portion 56. Again, the speed of the hub is dependent upon the angle of the portion 56 with respect to the groove in the shaft, i.e. 157.5 degrees for each revolution of 360 degrees of the shaft 40, the ball 46 will traverse back and forth twice.

While the hub 36 is being moved at speeds dependent upon the angles of its internal groove with respect to the shaft groove, the hub 38 is also moved in a somewhat similar manner in accordance with the angles of the groove 49. In the case of the hub 38, the ball 47 rides across portions 60, 62, 64 and 66 of the grooves 49.

Both balls 46 and 48 are simultaneously moving to drive the hubs 36 and 38. However, both hubs will move at different rates of speed. As the ball 46 traverses across the 22.5 degree portions of the groove, the ball 47 traverses the 157.5 degree portions. Likewise, as the ball 46 traverses across the 157.5 degree portions of the ball 48 will traverse a 22.5 degree portion.

Referring back to FIGURE 2, it may be seen that the vane elements 32 and 34 are moved at the same rates of speed as their associated hub elements 36 and 38, respectively. Consequently the vanes 32 and 34 will expand and contract in a manner similar to the piston operation described in connection with FIGURES 1a, 1b, 1c and 1d.

In some cases it may be desirable to have a number of curved grooves within the hub elements. In this case, a plurality of balls may be employed for transmitting motion from the shaft to one of the hubs. As mentioned, this transmission of motion alternates from one hub to the other hub through the shaft, with the motions between the respective hubs or vanes being reciprocal in nature.

Also, it is conceivable that some designs may require a plurality of grooves in the shaft.

The motion transmitting element may assume a variety of different forms other than the ball illustrated. For example, the grooves in the shaft and hubs may be cut somewhat deeper than illustrated. A solid linking element having a ball on each end may then be disposed between the grooves of the hubs and shaft. Other elements acting as key or pin linking members for transmission of motion may also be employed.

If it is desired, a plurality of devices including the present invention may be provided for a greater number of operating cycles. Also, more than two compression and explosion strokes may be provided in the same cylinder by providing more than four grooves in the hubs. For example, eight grooves having the same relative angular relationships as the four illustrated could be provided for eight cycle operation. Of course, the number of spark plugs, fuel inlets and outlets must also be correspondingly increased to provide efficient operation. The timing of the sparks provided must also be provided in such increased multiple cycle engines.

What is claimed is:

1. Transmission means for driving a drive shaft at a relatively constant speed, first and second hub elements having central apertures to form cylindrical surfaces, each having curved grooves of different angles therein, said hub elements being dimensioned to fit over said drive shaft with said surfaces disposed to engage the surface of said drive shaft, said drive shaft including a third groove, motion transmitting means disposed within the curved grooves of said first and second elements and said third groove of said drive shaft to move axially of said drive shaft when said drive shaft is moved, and means for driving said first and second elements to transmit motion to said drive shaft through said motion transmitting means, the relative speeds of said first and second elements being different than the speed of said drive shaft, with said relative speeds being dependent upon the different angles of said curved grooves in the surfaces of said first and second hub elements with respect to said third groove.

2. The invention as set forth in claim 1 wherein said first and second elements are driven by the internal combustion of mixtures ignited between said first and second elements.

3. The invention as set forth in claim 1 wherein the relative speeds of said first and second elements are approximately 7 to 1 with respect to each other.

4. The invention as set forth in claim 1 wherein the speeds of said first and second elements are complementary with respect to each other.

5. The invention as set forth in claim 1 wherein said first and second elements change the relative directions of speed twice for each revolution of 360 degrees.

6. The invention as set forth in claim 5 wherein one of said elements acts as a driving element for each 180 degrees revolution and as the driven element for each 180 degrees of revolution.

7. The invention as set forth in claim 6 wherein the driving element transmits motion to said driven element through said motion transmitting means and said drive shaft.

8. Motion transmission means comprising a pair of hub members, each of said hub members having an aperture forming a cylindrical surface with a groove therein, a shaft member dimensioned to fit within the apertures of said hub members and having a groove therein, the relative angles of the grooves in said hub members with respect to the groove in said shaft being different, motion transmission elements disposed within the grooves of said hub members and said shaft member to be moved axially of said shaft member when said shaft member is moved whereby movement of said hub members is transmitted to said shaft member, the relative movement of said hub members being different and dependent upon the degree of the angles of said grooves in said hub members with respect to said shaft.

9. Motion transmission means comprising a pair of vane members each having a centrally disposed integrally connected hub element having an aperture therein, each of said hub elements including an inner bearing surface having a spiral groove therein, the angular relationship between the grooves of said hub elements being different with respect to each other, a shaft dimensioned to fit within the apertures of said hub elements and having a substantially straight groove therein, said shaft being in rolling contact with the inner surfaces of said hub elements, a pair of ball elements disposed within the spiral grooves of said hub elements and said groove of said shaft to be moved axially of said shaft when said shaft is moved to permit movement of said vane members to be transmitted to said shaft through said ball elements, with the speeds of said vane members being different and dependent upon the speed of said shaft member and the degree of angles of the helical grooves within said hub elements.

10. Motion transmission means comprising a pair of vane members adapted to be driven by the ignition of fuel therebetween, each of said vane members having a centrally disposed integrally connected hub element having a circular aperture therein, each of said hub elements having an inner surface with a spiral groove therein, the angular relationship between the spiral grooves being different to provide different relative movements of said hub elements, said spiral grooves extending around the interior of said hub elements 360 degrees, a shaft dimensioned to fit within the apertures of said hub elements to engage the inner surfaces thereof and having a substantially straight groove therein, a pair of ball elements disposed within the spiral grooves of said hub elements and said groove of said shaft to be moved axially of said shaft when said shaft is moved to permit movement of said vane members to be transmitted to said shaft through said ball elements, with the speeds of said vane members being dependent upon the speed of said shaft member and the angles of the spiral grooves within said hub elements.

11. The invention as set forth in claim 10 wherein said spiral grooves traverse said hub elements twice in two directions for each revolution of said shaft.

12. Motion transmission means comprising a pair of vane members adapted to be driven by the ignition of fuel therebetween, each of said vane members having a centrally disposed integrally connected hub element having a circular aperture therein, each of said hub elements having a spiral groove therein, the spiral grooves in said hub elements extending in different angular directions, said spiral grooves extending around the interior of said hub elements 360 degrees, said spiral grooves further traversing said hub elements twice in two different directions for each revolution of said shaft, a shaft dimensioned to fit within the apertures of said hub elements to engage the inner surface bearings thereof and having a substantially straight groove therein, a pair of ball elements disposed within the spiral grooves of said hub elements and said groove of said shaft to be moved axially of said shaft when said shaft is moved to permit movement of said vane members to be transmitted to said shaft through said ball elements, the angular relationship of the grooves in said hub elements with respect to each other being such that the movements of said vane members are complementary with respect to each other, with the speeds of said vane members being dependent upon the speed of said shaft member and the angle of the helical grooves within said hub elements.

13. The invention as set forth in claim 12 wherein two substantially similar pairs of complementary grooves are provided in each said hub element in said pair of vane members, with the angular relationship of one of said pair of grooves in one said hub element with respect to the pair of grooves in said other hub element being approximately 7 to 1.

14. Motion transmission means comprising a shaft element having a groove therein, a pair of movable members each having a centrally disposed hub, each of said hubs having a central aperture and including an inner surface bearing with grooves thereon, said shaft element being disposed within the apertures of said hubs to engage the inner surface bearings thereof, the grooves of said hubs being disposed in operative positions with respect to the groove of said shaft element, a connecting element disposed within the grooves of said hubs and said shaft element to be moved axially with said shaft element when said shaft element is moved to transmit motion from said hubs to said shaft element, the angular relationship between the groove of said shaft element with respect to the grooves of said hubs causing different relative movements between said hubs with respect to each other when said shaft element is moved at a relatively constant speed.

References Cited by the Examiner

UNITED STATES PATENTS

| | | | |
|---|---|---|---|
| 1,920,201 | 8/33 | Kolko | 123—11 |
| 2,380,873 | 7/45 | Schafer et al. | 77—64 |
| 2,630,022 | 3/53 | Terdina | 74—424.8 |
| 2,796,776 | 6/57 | Lock et al. | 74—822 |
| 3,006,215 | 10/61 | Musser | 74—665 |
| 3,023,631 | 3/62 | Curtis | 74—424.8 |
| 3,053,105 | 9/62 | Cole | 74—424.8 |

FOREIGN PATENTS 28,750   1913   Great Britain.

KARL J. ALBRECHT, *Primary Examiner.*

WILBUR J. GOODLIN, JOSEPH H. BRANSON, JR.,
*Examiners.*